Sept. 5, 1967            A. P. STEWART, JR            3,340,072

PROCESS FOR PRODUCING ASEPTICALLY CANNED MILK

Filed June 22, 1964            2 Sheets-Sheet 1

INVENTOR.
Aubrey P. Stewart, Jr.,
BY Hofgren, Wegner, Allen
Stellman & McCord
Attys.

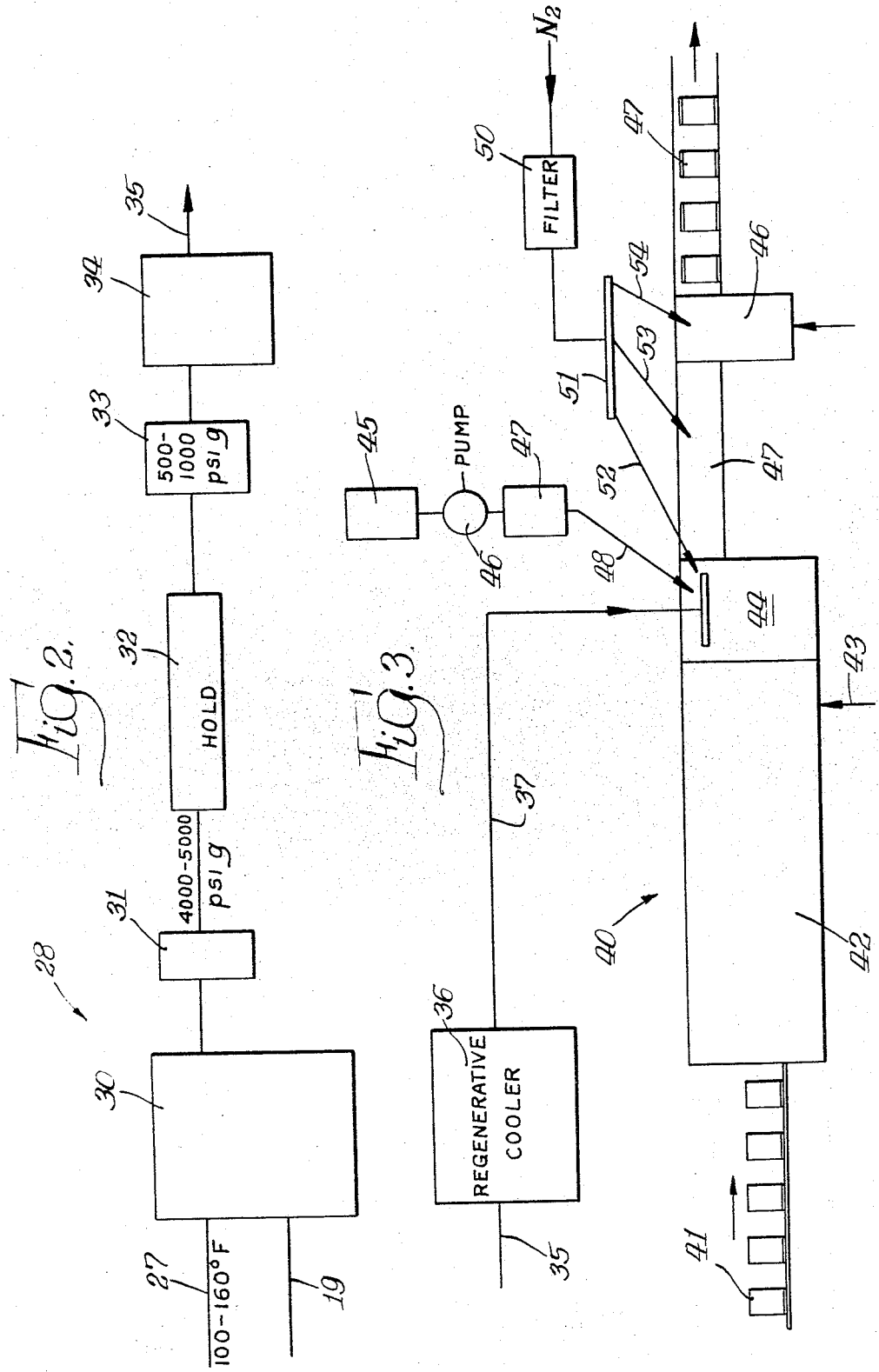

United States Patent Office 3,340,072
Patented Sept. 5, 1967

3,340,072
PROCESS FOR PRODUCING ASEPTICALLY
CANNED MILK
Aubrey P. Stewart, Jr., Corning, Iowa, assignor to Nodaway Valley Foods, Inc., a corporation of Iowa
Filed June 22, 1964, Ser. No. 376,793
6 Claims. (Cl. 99—212)

This invention relates to new aseptically canned milk products and to processes for producing the same.

It is a general object of the present invention to produce a new and improved aseptically canned milk product and a new and improved process for producing the same.

In my copending application "Method of Sterilization" filed in the United States Patent Office on Mar. 13, 1964, as Ser. No. 351,803 (now patent No. 3,230,095) I have described a process for the manufacture of high-temperature, short-time sterilized and aseptically canned dairy products. When the method disclosed in my copending application is used to produce sterilized whole milk, concentrated whole milk, and products containing butterfat such as cream, there results a product which is quite acceptable in flavor and storage life. When the storage of such products is continued beyond several months, however, occasional consumer objections have been voiced to the effect that the flavor of the reconstituted concentrated milk, for example, is not equal to that of fresh milk.

In the dairy industry it is generally recognized that a flavor score of 40 represents a good quality fresh milk, a flavor score of 36 is barely acceptable, and a flavor score of 34 or below represents milk which is definitely objectionable and no longer usable for beverage purposes. Objectionable flavors can and do occur in fresh milk and have been classified as oxidized, feedy, sour, malty, rancid, etc. These flavors occur because of mishandling, exposure to sunlight or the growth of bacteria, or they may result from the food which the cow had eaten which imparted an "off" flavor to the milk. In the case of sterilized and aseptically canned milk, the most usual flavor criticisms are that the milk tastes cooked, stale, oxidized, astringent, chalky, coconut, or lactone.

The off-flavors in sterilized milk are usually the result of the heat treatment used in the sterilization of the milk, together with the chemical reactions occurring in the product on prolonged storage. I have found that the decrease in flavor score on prolonged storage of sterilized milk can substantially be reduced if the quantity of oxygen dissolved in the product is substantially reduced and held to a minimum. Utilizing commercially available aseptic filling and canning equipment substantial amounts of oxygen are present in the head space of the cans and included within the product itself during the filling of the milk into the cans and the sealing of the lids thereon. I have found that the oxygen content can be substantially reduced not only through complete deaeration of the product, as described in my said copending application, but by reduction of any oxygen incorporated during the actual canning step. I accomplish this by reducing the foaming of the milk which normally occurs during filling and maintaining the atmosphere in the filling and lid-applying areas free of oxygen during the filling and sealing operation. Thus, by the use of the apparatus and process hereinafter more fully described, I have been able to reduce the rate of oxygen to milk from 6 to 8 mg. of oxygen per liter of milk to a level of 3 to 4 mg. oxygen per liter by sweeping the filling and sealing chambers with an inert gas, i.e. nitrogen. A further reduction to levels between 0.5 and 1.5 mg. oxygen per liter has been obtained by additionally preventing foaming during the filling by spraying the milk during the filling operation with a fine spray of sterile anti-foaming agent such as silicone or melted butter oil directed at the milk surface.

The degree of cooked flavor can be substantially reduced through the use of vacuum treatment after sterilization, especially if at least a part of the evaporation can be accomplished under high vacuum. However, there still appears to be a certain amount of cooked flavor which remains and there seems to be a relationship between the degree of this residual cooked flavor and the development of other off-flavors on storage, the principal storage off-flavor being classified as "stale." It is my belief that a principal reactive material in milk, one which is associated with residual cooked flavor and the development of storage off-flavors, is material normally associated with, or concentrated on, the fat globule surfaces. I believe these materials to be phospholipids. When milk is heated, as in the sterilization step, reactions occur wherein the phospholipids either change in themselves to form other compounds, catalyze undesirable reactions, become precursors of compounds which are themselves undesirable, or react in an undesirable manner with other materials in milk to cause cooked flavor and development of other off-flavors including "stale."

When whole milk is separated by normal methods into cream and skim milk (at a temperature of approximately 90° F.) about two-thirds of the phospholipids remain with the cream as a part of the fat globule membrane. When this cream is churned into butter, the major portion of the phospholipids will be in the buttermilk and upon melting of the butter and further washing of the butter oil, an additional reduction of the phospholipid content of the butter oil may be obtained. I have also found that by separating whole milk at a temperature on the order of 45° F. and reseparating the skim milk therefrom at 90° F. a skim milk results which contains only about one-fifth to one-tenth the phospholipids originally present in the milk. Separating at 45° F. alone yields lower phospholipids in the skim milk than higher temperature separation. Thus, it is possible to prepare low phospholipid skim milk and low phospholipid butter oil. When these are recombined to form whole milk or whole milk concentrate, high-temperature, short-time sterilized and aseptically canned, the resulting product has a lesser degree of cooked flavor and lesser rate of stale flavor development (especially when oxygen content in the final can is maintained at a low level) as compared with whole milk or whole milk concentrate sterilized and canned with normal phospholipid content. An even more striking improvement in flavor can be achieved through the separate sterilization of low phospholipid content skim milk or skim milk concentrate, vacuum treatment, etc., of the skim milk or skim milk concentrate as described in my U.S. Patent No. 3,230,095 "Method of Sterilization" and injection of sterile, low phospholipid butter oil immediately prior to sterile homogenization. The butter oil is best sterilized by ultrafiltration, although good results are obtained by high-temperature, short-time sterilization of the butter oil or emulsion of the butter oil in water. Aseptically canned milk or concentrated milk made according to this procedure have an initial flavor equal to that of fresh milk, i.e. a score of 40, and remain in the flavor score range of 36 to 40 over a period of six months at a temperature of 72° F.

Improved results, compared with processing normal phospholipid products, can be accomplished by such variations as combining low-temperature separated skim milk with high-temperature separated cream, or by any means reducing the phospholipid content present in the product during heat treatment in processing.

Laboratory tests designed to measure compounds related to cooked flavor have shown a reduction of cooked flavor substances to a level between one-half and one-fifth that are found in whole milk concentrate of normal phospholipid content when the concentrate is made from sterile concentrated skim milk combined with filtration-sterilized butter oil. Similar reductions have been determined from analyses for chemical associated with stale, coconut and lactone flavors.

Variations in the basic process include the incorporation of small amounts of emulsifier in the butter oil to aid in the homogenization of the butter oil into the skim milk or skim milk concentrate; and incorporation of oil soluble vitamins (vitamin A) to be cold-sterile filtered with the butter oil and thus preserving the strength of the vitamin A, and preventing it from decomposing into off flavored substances.

In the accompanying drawings,

FIGURE 2 is a schematic illustration of the homogenization process; and

FIGURE 3 is a schematic drawing of the aseptic canning steps of the process.

Figure 1:
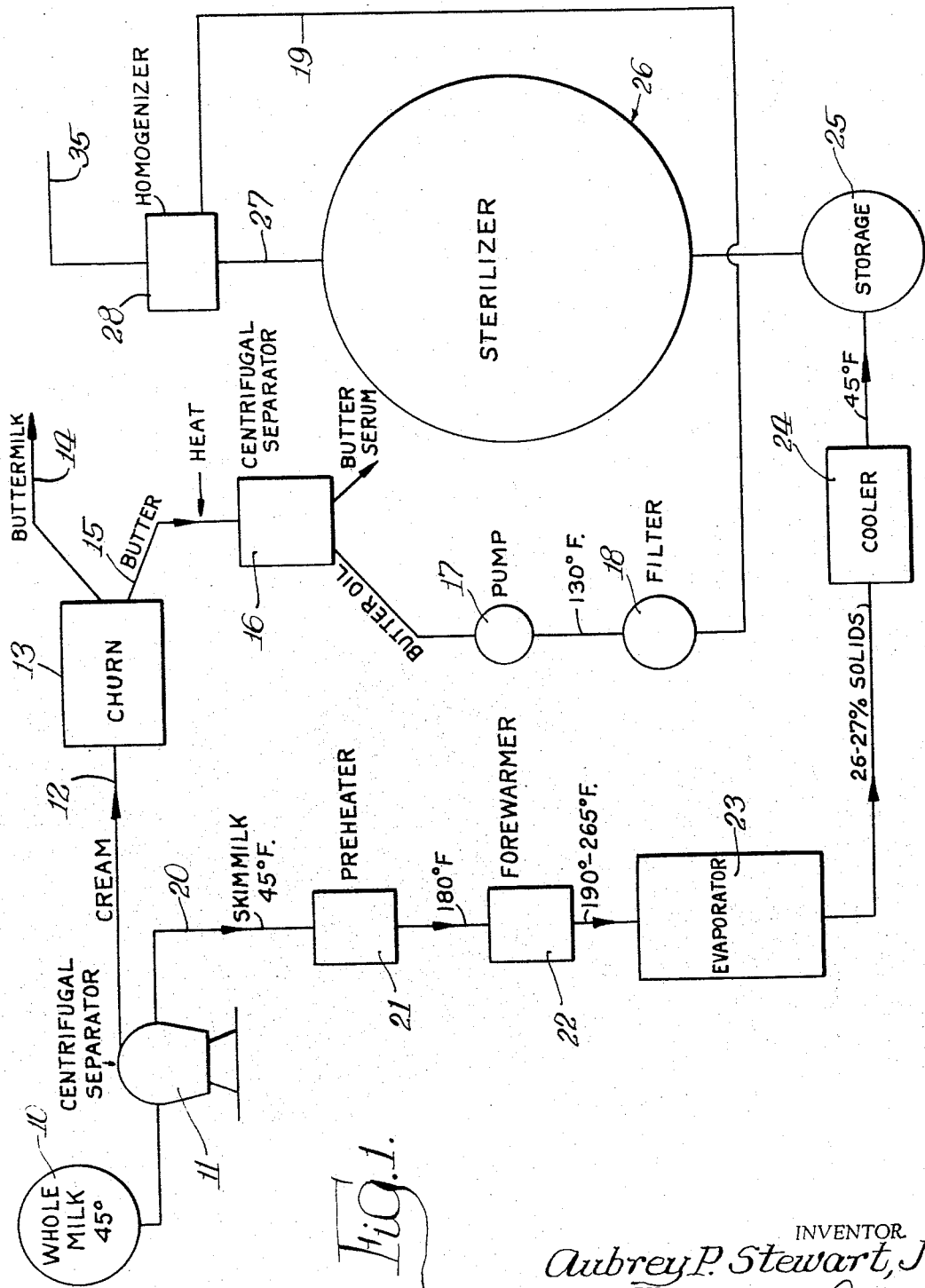
FIGURE 1 is a schematic illustration of the new process up to the point of homogenization.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

Referring now to the drawings, whole milk is stored at about 45° F. in the container indicated as 10 and is directed therefrom into a centrifugal separator 11, with the cream being directed along line 12 into a churn 13 which delivers buttermilk into the line 14 and butter into the line 15. The butter is subjected to heat as indicated and then passed into the centrifugal separator 16 which separates the butter oil from the butter serum with the former being directed to a high pressure pump 17 and thence through a very fine filter 18 to remove therefrom all bacteria and other septic media so that the butter oil emerging from the filter 18 and directed into line 19 is sterile.

The skim milk from the centrifugal separator 11 is directed into line 20 through a preheater 21 where its temperature is raised to about 180° F. and then to a forewarmer where its temperature is raised from 190° F. to 265° F. before being introduced into the evaporator 23. The evaporator increases the solids content of the skim milk to the desired degree, usually about 26 to 27% and the concentrated skim milk is then directed into a cooler 24 where its temperature is reduced to 45° F. for storage in the tank 25.

From the storage tank 25, the concentrated skim milk is directed into the sterilizing apparatus generally designated as 26 which may be the same sort of apparatus fully described in my said copending application "Method of Sterilization," to the step where it is introduced into the homogenizer thereof. An improved homogenizing method is provided by the present process. A substantially greater amount of milk is directed into line 27 and into homogenizer 28 where it is mixed with a lesser amount of butter oil from the line 19 for example, in the ratio of about ten parts of concentrated skim milk to one part by weight of butter oil.

Referring to FIGURE 2, the homogenizing phase and certain new and novel features thereof are disclosed. The homogenizer includes a first stage indicated at 30 where homogenization takes place at about 4000 to 5000 p.s.i.g. created by the first stage valve 31. The sterile butter oil is introduced into homogenizer 30 through the line 19 and the concentrated milk is introduced through the line 27. The homogenized products are then introduced into a holding zone 32 where they are held from 2 to 5 minutes before passing through a second stage valve and a second homogenizer 34 operating at about 500 to 1000 p.s.i.g.

From the homogenizer, the product is directed into line 35 and into the regenerative cooling system 36, more fully described in my said copending application, where it is cooled to about 45° F.

From the last regenerative cooler 36 the product is directed into line 37 and thence into an aseptically canning apparatus 40 as shown in FIGURE 3.

Cans 41 are carried by a suitable conveyor into a sterilizer 42 receiving steam through line 43 to sterilize the cans. When the cans reach the filling zone indicated at 44, they are filled with milk 37 while at the same time an antifoaming agent such as butter oil, silicone or similar liquid from container 45 is forced by pump 46 through a filter 47 to sterilize the same and direct it as a spray, as indicated by the line 48, on to the surface of the milk as it is being filled into the can at the filling station 44. Simultaneously, an inert gas such as nitrogen is directed through a filter 50 to remove bacteria and other septic media therefrom and thence into a manifold 51 to which lines 52, 53 and 54 are connected to sweep the filling zone 44, the lid-applying and sealing zone 46, and the intermediate passage zone 47 free of oxygen. Thus, all of the time the milk is exposed, i.e. the interim between leaving the end of the line 37 and the application of the lid in zone 46, the atmosphere is oxygen free. Sealed cans 47 then leave the aseptic canning equipment.

The two-stage homogenization process described is of substantial value. In this instance, the first-stage homogenization is at high pressure to form small fat globules and these globules then clump to a certain degree over a 2 minute to 5 minute time interval at temperatures in the range of 100° F. to 160° F., following which a low pressure homogenization permanently destroys these clumps and yields a stable fat emulsion which shows little inclination to separate upon storage.

An additional advantage of the process I have described is the opportunity of preparing low cholesterol milk since a substantial portion of the cholesterol in milk is associated with the phospholipids. Also, butter oil itself may be almost completely freed from cholesterol by solvent extraction prior to injection to skim milk or skim milk concentrate.

I claim:

1. A process for producing an asceptically canned milk product comprising, chilling whole milk to about 45° F., separating the milk to produce cream and skim milk, heating the skim milk to between 190° F. and 265° F., subjecting the heated skim milk to an evaporation process to increase the milk solids thereof to about 26%, sterilizing the evaporated skim milk, sterilizing butter oil by passing the same through a fine filter, mixing about ten parts by weight of said sterilized skim milk with one part by weight of filtered butter oil, homogenizing the mixture of skim milk and butter oil through a first homogenizing step at about 4000 to 5000 p.s.i.g., holding the homogenized mixture for about two to five minutes and then rehomogenizing the mixture at about 500 to 1000 p.s.i.g., cooling the homogenized mixture to about 45° F., sterilizing a container, passing the sterile container into a filling zone, sweeping oxygen from the filling zone by a current of sterile inert gas, filling the container in the zone with the cooled homogenized mixture while spraying the milk in the zone with a sterile filtered butter oil, and then sealing the container under aseptic oxygen-free conditions.

2. A process for producing an aspectically canned milk product comprising, chilling whole milk, separating the milk to produce cream and skim milk, heating the skim milk, subjecting the heated skim milk to an evaporation process to increase the milk solids thereof, sterilizing the evaporated skim milk, sterilizing butter oil by passing the same through a fine filter, mixing about ten parts by weight of said evaporated skim milk with one part by weight of said filtered butter oil, homogenizing the mixture of skim milk and butter oil through a first homogenizing step at an elevated pressure, holding the homogenized mixture for about two to five minutes at a temperature between 100° F. and 160° F. and then rehomogenizing the mixture at a second elevated pressure substantially lower than said first mentioned elevated pressure, cooling the homogenized mixture, sterilizing a container, passing the sterile container into a filling zone, sweeping oxygen from the filling zone by a current of sterile inert gas, filling the container in the zone with the cooled homogenized mixture while spraying the milk in the zone with a sterile filtered butter oil, and then sealing the container under aseptic oxygen-free conditions.

3. A process for producing an aseptically canned milk product comprising, separating whole milk to produce cream and skim milk, subjecting the skim milk to an evaporation process to increase the milk solids thereof, sterilizing the evaporated skim milk, sterilizing butter oil, mixing an amount of the evaporated skim milk with a substantially lesser amount of the filtered butter oil, homogenizing the mixture of skim milk and butter oil first at a relatively high pressure followed by a short holding period at a temperature between about 100° F. and 160° F. and then at a second relatively lower pressure, sterilizing a container, passing the sterile container into a filling zone, sweeping oxygen from the filling zone by a current of sterile inert gas, filling the container in the zone wtih the cooled homogenized mixture while spraying the milk in the zone with a sterile filtered butter oil, and then sealing the container under aseptic oxygen-free conditions.

4. A method for producing a sterile milk product, comprising, mixing an amount of sterile skim milk and a substantially lesser amount of sterile butter oil, homogenizing the mixture by passing through a first homogenizing stage at about 4000 to 5000 p.s.i.g., holding the homogenized mixture for about two to five minutes at a temperature between 100° F. and 160° F., and then rehomogenizing the mixture at about 500 to 1000 p.s.i.g.

5. A method of aseptically canning evaporated milk, comprising, removing butterfat from whole milk, concentrating and sterilizing the milk, mixing an amount of sterile butter oil with a substantially greater amount of said sterilized milk, homogenizing the mixture through a first high pressure stage, holding the homogenized mixture at a temperature between 100° and 160° F. for a short period of time, and then rehomogenizing the mixture through a second stage at a lower pressure and aseptically canning the mixture.

6. A method of preparing aseptically canned milk, comprising, removing phospholipids from whole milk, concentrating and sterilizing the milk, mixing an amount of sterile relatively phospholipid-free fat with a substantially greater amount of said sterilized milk, homogenizing the mixture through a first high pressure stage, holding the homogenized mixture at a temperature between 100° and 160° F. for a short period of time, and then rehomogenizing the mixture through a second stage at a lower pressure, and aseptically canning the mixture.

References Cited

UNITED STATES PATENTS

| | | | |
|---|---|---|---|
| 2,155,843 | 4/1939 | Schmidt | 99—212 X |
| 2,685,522 | 8/1954 | Dunmire | 99—55 X |
| 2,772,979 | 12/1956 | Graves | 99—184 |
| 3,052,555 | 9/1962 | Stewart et al. | 99—184 X |
| 3,065,086 | 11/1962 | Leviton et al. | 99—184 X |
| 3,080,235 | 3/1963 | Hodson et al. | 99—62 X |

FOREIGN PATENTS 1,361,793  4/1964  France.

OTHER REFERENCES

Brunner, J. R.: Journal of Dairy Science, vol. XXXIII, No. 10, October 1950, pages 741–746.

A. LOUIS MONACELL, *Primary Examiner.*

RAYMOND J. JONES, *Examiner.*

S. E. HEYMAN, *Assistant Examiner.*